United States Patent [19]

Poole et al.

[11] Patent Number: 4,833,038

[45] Date of Patent: May 23, 1989

[54] UV CURABLE COATINGS CONTAINING OXALANILIDE STABILIZERS, METHOD OF CURING, AND COATED SUBSTRATES THEREFROM

[75] Inventors: James E. Poole, Gibsonia; Mildred L. McKinley, Glenshaw, both of Pa.

[73] Assignee: PPG Industries, Inc., Pittsburgh, Pa.

[21] Appl. No.: 168,068

[22] Filed: Mar. 14, 1988

[51] Int. Cl.$^4$ .................. B32B 15/08; B32B 27/30
[52] U.S. Cl. .................. 428/457; 428/463; 522/10; 522/113
[58] Field of Search .............. 428/457, 463; 522/113, 522/10; 525/285; 524/220, 102; 564/154; 558/190; 252/403

[56] References Cited

U.S. PATENT DOCUMENTS

| | | | |
|---|---|---|---|
| 3,579,485 | 5/1971 | Folzenlogen et al. | 525/285 |
| 3,808,273 | 4/1974 | Burdet et al. | 564/154 |
| 3,816,568 | 6/1974 | Hofer et al. | 558/190 |
| 4,412,024 | 10/1983 | Avar et al. | 524/220 |
| 4,485,034 | 11/1984 | Avar et al. | 252/403 |
| 4,616,051 | 10/1986 | Paolino | 524/102 |

FOREIGN PATENT DOCUMENTS

| | | | |
|---|---|---|---|
| 2000512A | 1/1979 | United Kingdom | 524/220 |
| 2137211A | 10/1984 | United Kingdom | 524/220 |

OTHER PUBLICATIONS

Product Bulletin, 2-435/84, "Sanduvor® 3206 Liquid", Sandoz Chemicals Corporation, pp. 1-7.

Primary Examiner—Thomas J. Herbert
Attorney, Agent, or Firm—Thomas M. Breininger

[57] ABSTRACT

A metallized plastic substrate having directly adhered to the metallized surface thereof, a transparent, cross-linked film from a coating composition comprises: (A) from 4 to 10 percent of an oxalanilide ultraviolet light (UV) stabilizer dissolved in the coating composition, the UV stabilizer corresponding to the formula

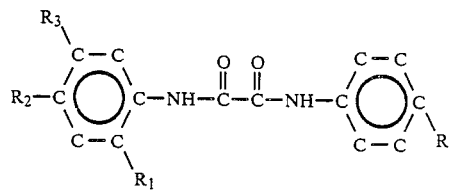

in which R is $C_{6-22}$ alkyl or $C_{6-22}$ alkoxy, $R_1$ and $R_2$ are independently hydrogen, $C_{1-8}$ alkyl, $C_{1-12}$ alkoxy, $C_{1-12}$ alkylthio, phenoxy or phenylthio, provided that $R_1$ and $R_2$ may not both be selected from alkylthio, phenoxy and phenylthio, and $R_3$ is hydrogen or $C_{1-8}$ alkyl; (B) from 20 to 80 percent of a radiation sensitive monomer having at least two addition polymerizable unsaturated bonds; (C) from 0.1 to 5.0 percent of a photopolymerization initiator; and (D) from 80 to 20 percent of an acrylic addition polymer having at least one amino group and having a number average molecular weight of about 8,000–70,000, the addition polymer being derived from a mixture of copolymerizable ethylenically unsaturated monomers containing a monomeric ethylenically unsaturated amine. The percentages of components (A), (B), (C) and (D) are by weight based on nonvolatile components (i.e., solids) of the coating composition.

7 Claims, No Drawings

UV CURABLE COATINGS CONTAINING OXALANILIDE STABILIZERS, METHOD OF CURING, AND COATED SUBSTRATES THEREFROM

BACKGROUND OF THE INVENTION

This invention is directed to ultraviolet light (UV) curable coating compositions containing an oxalanilide ultraviolet light stabilizer (UV absorber) dissolved therein. The compositions are particularly useful as coatings for a variety of metallized, plastic substrates (both thermoplastic and thermoset), especially as topcoats for providing excellent weathering resistance as evidenced by excellent resistance to humidity and hot/-cold cycling.

It is known to apply a thin film of metal to a nonmetallic substrate to make a metallized substrate and to provide the metallized substrate with a protective coating. Such coated, metallized substrates are useful, for example, for such diverse articles as nonmetallic parts on automotive vehicles, and containers and container caps for cosmetics. The plastic substrates for such articles often are composed of heat sensitive materials such as heat sensitive plastics which can distort when exposed to elevated temperatures. It would be desirable to provide coatings for such metallized substrates that can be cured efficiently at temperatures below the temperatures at which such heat sensitive substrates distort. Moreover, it would be desirable to provide coatings for such substrates which are not only decorative, but also are highly adherent to the metallized substrate, and are resistant to weathering as occurs upon prolonged exposure to various atmospheric conditions of temperature and humidity. These and other objects will become apparent to one skilled in the art from the disclosure contained herein.

SUMMARY OF THE INVENTION

The present invention is for a coating composition which crosslinks upon exposure to ultraviolet radiation to produce a transparent coating. The coating composition comprises, and typically consists essentially of: (A) from 4 to 10 percent of an oxalanilide ultraviolet light (UV) stabilizer dissolved in the coating composition, the UV stabilizer corresponding to the formula

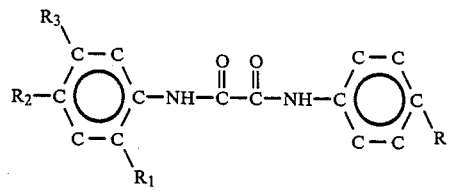

in which R is $C_{6-22}$ alkyl or $C_{6-22}$ alkoxy, $R_1$ and $R_2$ are independently hydrogen, $C_{1-8}$ alkyl, $C_{1-12}$ alkoxy, $C_{1-12}$ alkylthio, phenoxy or phenylthio, provided that $R_1$ and $R_2$ may not both be selected from alkylthio, phenoxy and phenylthio, and $R_3$ is hydrogen or $C_{1-8}$ alkyl; (B) from 20 to 80 percent of a radiation sensitive monomer having at least two addition polymerizable unsaturated bonds; (C) from 0.1 to 5.0 percent of a photopolymerization initiator; and (D) from 80 to 20 percent of an acrylic addition polymer having at least one amino group and having a number average molecular weight of about 8,000–70,000, said addition polymer being derived from a mixture of copolymerizable ethylenically unsaturated monomers containing a monomeric ethylenically unsaturated amine. The percentages of components (A), (B), (C) and (D) are by weight based on nonvolatile components (i.e., solids) of the coating composition.

The invention also is for a method of coating comprising: (I) applying to the metallized surface of a metallized, plastic substrate a film of the coating composition of the invention and (II) curing the film by exposing it to ultraviolet radiation.

Additionally, the invention is for a metallized plastic substrate having directly adhered to the metallized surface thereof, a transparent, crosslinked film from a coating composition of the invention.

DETAILED DESCRIPTION OF THE INVENTION

A coating composition of the invention crosslinks upon exposure to ultraviolet radiation to produce a transparent (clear) film (coating). The composition contains, as component (A), from 4 to 10 percent of an oxalanilide ultraviolet light (UV) stabilizer dissolved in the coating composition, the UV stabilizer corresponding to the formula (I)

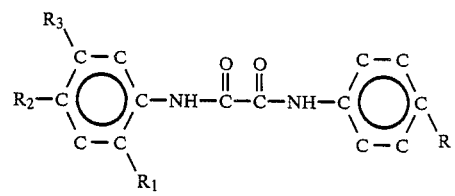

in which
R is $C_{6-22}$ alkyl or $C_{6-22}$ alkoxy,
$R_1$ and $R_2$ are independently hydrogen, $C_{1-8}$ alkyl, $C_{1-12}$ alkoxy, $C_{1-12}$ alkylthio, phenoxy or phenylthio, provided that $R_1$ and $R_2$ may not both be selected from alkylthio, phenoxy and phenylthio, and
$R_3$ is hydrogen or $C_{1-8}$ alkyl.

R is preferably located in the 4'-position and when alkoxy is preferably $C_{8-14}$ alkoxy which is preferably a mixture of isomeric alkoxy groups. More preferably, however, R is an alkyl group which may be linear or branched or, preferably, a mixture of isomeric alkyl groups. R is preferably $C_{8-18}$ alkyl, more preferably $C_{10-14}$ alkyl, particularly dodecyl. Particularly preferred is a mixture of isomeric dodecyl groups.

When $R_1$ and $R_2$ are alkyl, they preferably are methyl or ethyl, and when they are alkoxy, they preferably are $C_{1-8}$ alkoxy, more preferably methoxy or ethoxy, particularly ethoxy. When $R_1$ and $R_2$ are alkylthio, they preferably are $C_{1-8}$ alkylthio, more preferably methylthio.

Preferably at least one of $R_1$ and $R_2$ is other than hydrogen or alkyl. More preferably $R_1$ is alkoxy and $R_2$ is hydrogen or alkoxy, particularly hydrogen. Particularly preferred is 2-ethoxy-4'-isododecyloxalanilide in which the isododecyl group comprises a mixture of isomeric dodecyl groups.

Compounds corresponding to formula (I) above, as well as their preparation, are known in the art. In this regard reference can be made to U.S. Pat. No. 4,412,024 assigned to Sandoz Ltd. the disclosure of which is hereby incorporated by reference. For purposes of the present invention, these compounds typically are utilized as liquid concentrates containing at least 30 percent and typically at least 50 percent by weight compound in an organic solvent such as a hydrocarbon solvent which may be aromatic, e.g., benzene, toluene or xylene, or aliphatic, e.g., hexane, octane, petroleum fractions, etc. Other suitable solvents include alcohols, ethers, ketones and esters, examples of which include methylethyl ketone and ethyl acetate. Usually the solvents are hydrocarbons, particularly xylene, in which the compounds of formula (I) have solubilities of up to 80 percent at room temperature, and do not crystallize out even at low temperatures.

The percentage of component (A) in a composition of the present invention, as well as the percentages of components (B), (C) and (D), is by weight based on the nonvolatile components of the coating composition. The nonvolatile components are often referred to in the art as "solids".

A composition of the invention contains, as component (B), from 20 to 80 percent, preferably from 50 to 70 percent, by weight based on solids, of a radiation sensitive monomer having at least two addition polymerizable unsaturated bonds. Examples of such radiation sensitive monomers include ethylenically unsaturated acrylic or methacrylic esters such as ethylene glycol di(meth)acrylate, diethylene glycol di(meth)acrylate, tetraethylene glycol di(meth)acrylate, glycerol di(meth)acrylate, glycerol tri(meth)acrylate, 1,3-propylene glycol di(meth)acrylate, 1,2,4-butanetriol tri(meth)acrylate, 1,4-cyclohexanediol di(meth)acrylate, 1,4-benzenediol di(meth)acrylate, pentaerythritol tetra(meth)acrylate, 1,5-pentanediol di(meth)acrylate, trimethylolpropane tri(meth)acrylate; acrylic or methacrylic amides such as N,N-bis(beta- hydroxyethyl) (meth)acrylamide, methylene bis(meth)acrylamide, 1,6-hexamethylene bis(meth)acrylamide, diethylenetriamine tris(meth)acrylamide, bis(gamma-(meth)acrylamidepropoxy)ethane and beta-(meth)acrylamide ethylacrylate; and vinyl monomers such as divinyl benzene. Of the aforesaid radiation sensitive monomers, the (meth)acrylic esters of organic polyols are preferred, pentaerythritol triacrylate and hexanediol diacrylate being particularly preferred. Wherever used herein "(meth)acrylate" is intended to refer to the respective compound having acrylate functionality and/or the respective compound having methacrylate functionality.

Although not preferred, it should be understood that a composition of the invention may include one or more radiation sensitive monoethylenically unsaturated monomers examples of which include: mono (meth)acrylates such as methyl (meth)acrylate, ethyl (meth)acrylate, isopropyl (meth)acrylate, n-butyl (meth)acrylate, isobutyl (meth)acrylate, 2-ethylhexyl (meth)acrylate, 2-hydroxyethyl (meth)acrylate, isobornyl (meth)acrylate and tetrahydrofurfuryl (meth)acrylate; mono (meth)acrylic amides such as (meth)acrylamide, N(beta-hydroxyethyl) (meth)acrylamide, and vinyl monomers such as vinyl acetate, styrene and vinyl toluene.

Ultraviolet radiation (UV) generally is used to cure a composition of the invention. Any suitable source which emits ultraviolet light having a wavelength ranging from about 180 to about 400 nanometers may be employed. Suitable sources of ultraviolet light are generally known and include, for example, mercury arcs, carbon arcs, low pressure mercury lamps, medium pressure mercury lamps, high pressure mercury lamps, swirl- flow plasma arcs and ultraviolet light emitting diodes. Preferred are ultraviolet light emitting lamps of the medium pressure mercury vapor type. Such lamps usually have fused quartz envelopes and are ordinarily in the form of long tubes having an electrode at both ends. Typically, preferred medium pressure mercury lamps usually employed to cure a composition of the invention have outputs of about 200 watts per inch across the length of the tube.

Since UV light generally is used to cure a composition of the invention, the composition generally contains, as component (C), from 0.1 to 5.0 percent, based on solids, of a photopolymerization initiator (and/or photopolymerization sensitizer). Photoinitiators and photosensitizers are generally known in the art. Examples of photoinitiators include isobutyl benzoin ether, mixtures of butyl isomers of butyl benzoin ether, alpha,alpha-diethoxyacetophenone, and alpha,alpha-dimethoxy-alpha- phenylacetophenone. Examples of photosensitizers include benzophenone, anthraquinone, and thioxanthone. Other examples of photoinitiators and photosensitizers can be found in U.S. Pat. No. 4,017,652.

A composition of the invention contains, as component (D), from 80 to 20 percent, preferably from 30 to 50 percent by weight, based on solids, of an acrylic addition polymer having at least one amino group and having a number average molecular weight of about 8,000-70,000, preferably of about 10,000-50,000, as determined by gel permeation chromatography utilizing a polystyrene standard. The addition polymer is derived from a mixture of copolymerizable ethylenically unsaturated monomers containing a monomeric ethylenically unsaturated amine, preferably one selected from the group consisting of an acrylate-functional amine, a methacrylate-functional amine and a mixture thereof. The amount of monomeric ethylenically unsaturated amine in the mixture of copolymerizable ethylenically unsaturated monomers generally ranges from 1 to 25 percent by weight, preferably from 2 to 10 percent by weight, based on the total weight of monomers employed in the mixture. Examples of monomeric ethylenically unsaturated amines which may be employed include: (2-diethylamino)ethyl acrylate, (2-diethylamino)ethyl methacrylate, (2-dimethylamino)ethyl acrylate, (2-dimethylamino)ethyl methacrylate, N-t-butylaminoethyl methacrylate, (2-dipropylamino)ethyl acrylate, (2-dipropylamino)ethyl methacrylate, (2-dibutylamino)ethyl acrylate, (2-dibutylamino)ethyl methacrylate, [2-(di-2-hydroxypropyl)]ethyl acrylate, and [2-(di-2-hydroxypropyl)]ethyl methacrylate.

The mixture of copolymerizable ethylenically unsaturated monomers for preparing the aforesaid addition polymer generally additionally contains one or more other copolymerizable ethylenically unsaturated monomers, examples of which include: acrylic and methacrylic acids and their ester derivatives such as the alkyl acrylates and the alkyl methacrylates including, for example, methyl acrylate, ethyl acrylate, butyl acrylate, propyl acrylate, 2-ethylhexyl acrylate, methyl methacrylate, butyl methacrylate, 2-ethylhexyl methacrylate, decyl methacrylate, lauryl methacrylate, hydroxyethyl acrylate, hydroxypropyl acrylate, hydroxyethyl methacrylate, and hydroxypropyl methacrylate; isobornyl methacrylate and isobornyl acrylate; unsaturated amides such as acrylamide and methacrylamide; unsaturated nitriles such as acrylonitrile, methacrylonitrile and ethacrylonitrile; vinyl aromatic hydrocarbons such as styrene, alpha-methyl styrene, and vinyl toluene;

vinyl acetate; vinyl chloride; and unsaturated epoxy-functional monomers such as glycidyl acrylate and glycidyl methacrylate.

The addition polymer typically is prepared by free radical addition polymeriaation of the mixture of ethylenically unsaturated monomers in the presence of a vinyl polymerization initiator. Examples of suitable initiators include azo compounds such as alpha alpha'-azobis(isobutyronitrile); peroxides such as benzoyl peroxide and cumene hydroperoxide; tertiary butyl peracetate; isopropyl percarbonate and butyl isopropyl peroxy carbonate; and similar compounds. The quantity of initiator employed can be varied considerably. However, in most instances, it is desirable to utilize from about 0.1 to about 10 percent by weight based on the total weight of monomers employed. If desired, a chain modifying agent or chain-transfer agent can be added to the polymerization mixture. The mercaptans, such as dodecyl mercaptan, tertiary dodecyl mercaptan, octyl mercaptan, hexyl mercaptan, cyclopentadiene, allyl acetate, allyl carbamate and mercaptoethanol may be used for this purpose. The polymerization reaction typically is carried out in an organic solvent medium utilizing conventional solution polymerization procedures which are well known in the addition polymer art as illustrated with particularity in, for example, U.S. Pat. Nos. 2,978,437; 3,079,434 and 3,307,963. Organic solvents which may be utilized in the polymerization of the monomers include virtually any of the organic solvents heretofore employed in preparing conventional acrylic or vinyl polymers such as, for example, alcohols, esters, ketones, aromatic hydrocarbons or mixtures thereof.

Where desired, a composition of the invention may contain an organic solvent and/or diluent. Organic solvents which may be utilized include any of the organic solvents heretofore employed in ultraviolet light curable coating compositions which are compatible with components (A), (B), (C) and (D) of the composition of the invention. Examples of organic solvents include: esters such as n-butyl acetate, ethyl acetate and isobutyl acetate; ether alcohols such as ethylene glycol monoethyl ether, ethylene glycol monobutyl ether, propylene glycol monomethyl ether, dipropylene glycol monoethyl ether, propylene glycol monoethylether acetate, ethylene glycol monoethylether acetate, dipropylene glycol monoethylether acetate and diethylene glycol monoethylether acetate; ketones such as methyl ethyl ketone, methyl n-butyl ketone and methyl isobutyl ketone; lower alkanols containing 2 to 4 carbon atoms including ethanol, propanol, isopropanol and butanol; and aromatic hydrocarbons such as xylene, toluene and naphtha.

It has been found that, surprisingly, the presence of the UV stabilizer which is believed to function by absorbing ultraviolet light (but, unlike for example a UV photoinitiator, does not generate free radicals to initiate free radical polymerizations) does not inhibit curing of coating compositions of the invention using ultraviolet light. It would be expected that ultraviolet light absorbers would tend to interfere with UV curing. More surprising, even the relatively high levels of the UV stabilizer utilized in coating compositions of the invention (4 - 10 percent by weight based on solids) still allow for very efficient UV curing. Moreover, coating compositions of the invention provide UV cured, crosslinked films which not only exhibit outstanding adhesion properties but are highly resistant to weathering conditions as evidenced by their resistance to degradation from prolonged exposure to hot water and various atmospheric conditions of temperature and humidity.

Coating compositions of the invention may be applied to a substrate by any known means, for example, spraying, curtain coating, dipping, roll coating, brushing, doctor blade coating, etc. They may be preliminarily flashed or dried at ambient or elevated temperature to reduce or remove solvent if desired and then cured by ultraviolet radiation. Cure time will vary depending upon the particular formulation, the intensity of UV radiation employed, the amount of composition applied to the substrate and so forth. Given the disclosure herein, variation of these parameters would be within the level of ordinary skill in the art.

It has been found that compositions of the invention provide outstanding properties as transparent coatings over thin films of metal, such as aluminum, nickel, copper, chromium, chromium alloys, etc., which have been applied to nonmetallic substrates such as plastics examples of which include a wide variety of thermoplastic and/or thermoset plastics such as acrylonitrile-butadiene-styrene copolymers (ABS plastics), polyethylenes, polypropylenes and copolymers of ethylene and propylene, polycarbonates, polyesters and "glass-filled" polyesters (BMC, SMC), polyamides such as mineral filled nylons, polyarylates, acrylics, polystyrenes, and the like. The thin film of metal may be deposited by any of the generally known techniques of vacuum metallizing such as evaporation, sputtering, electroless deposition, and electroplating. Preferred techniques include evaporation and sputtering, especially evaporation. Typically the process generally includes the steps of application of a basecoat to the nonmetallic substrate, applying the thin film of metal over the basecoat, and thereafter applying a topcoat. As used herein the phrase, "thin film of metal" is intended to include metal films having a thickness of from 0.2 millimicrons (0.2 nanometers, 2 angstroms) to 5,000 millimicrons (5,000 nanometers, 50,000 angstroms). The method of the invention comprises: (I) applying to the metallized surface of a metallized, plastic substrate a film of the coating composition of the invention which crosslinks upon exposure to ultraviolet radiation to form a transparent coating and (II) curing the film by exposing it to ultraviolet radiation.

The examples which follow are submitted for the purpose of further illustrating the nature of the invention and should not be construed as a limitation on the scope thereof.

As used in the body of the specification, examples, and claims, all percents, ratios and parts are by weight unless otherwise specifically indicated. Wherever used herein, "pbw" means "parts by weight".

EXAMPLE 1

This example illustrates the preparation of a topcoat composition of the invention and the application and curing of the coating composition on a metallized plastic substrate.

(a) A clear, ultraviolet light (UV) curable basecoat composition is prepared by adding in order while mixing the ingredients set forth in the following TABLE 1. The resulting UV curable basecoat contains 40 percent by weight solids and 60 percent by weight solvents.

TABLE 1

| BASECOAT COMPOSITION | |
|---|---|
| Component | Amount (pbw) |
| Isopropanol | 185.3 |
| Methylisobutyl ketone | 185.3 |
| Naphtha[1] | 92.7 |
| Pentaerythritol triacrylate | 151.7 |
| Bisphenol-A diglycidylether diacrylate[2] | 151.7 |
| Nonionic fluorocarbon surfactant[3] | 0.6 |
| 2,2-Diethoxyacetophenone | 6.0 |

[1] Aromatic hydrocarbon solvent available as SOLVESSO 100.
[2] Available as NOVACURE 3700 from Interez Inc.
[3] Available as FC-431 from 3M Corporation.

(b) a clear, UV curable topcoat composition of the invention is prepared by adding in order while mixing the ingredients set forth in the following TABLE 2. The resulting UV curable topcoat composition contains 40 percent by weight solids and 60 percent by weight solvents.

TABLE 2

| TOPCOAT COMPOSITION | |
|---|---|
| Component | Amount (pbw) |
| n-Butyl acetate | 313.9 |
| 2-Ethoxy-4'-iso-dodecyloxalanilide concentrate[1] | 31.8 |
| Acrylic copolymer[2] | 290.4 |
| Alpha-hydroxy-alpha-dimethylphenyl ketone[3] | 6.4 |
| 2,2-Diethoxyacetophenone | 8.9 |
| Benzophenone | 9.5 |
| Nonionic fluorocarbon surfactant[4] | 0.6 |
| Pentaerythritol triacrylate | 80.1 |
| 1,6-Hexanediol diacrylate | 53.4 |

[1] Available as Sanduvor ® 3206 Liquid from Sandoz Chemicals Corp.
[2] An acrylic copolymer prepared from 87.4 pbw isobornyl acrylate, 49.9 pbw methyl methacrylate, 25.0 pbw 2-ethylhexyl acrylate, 12.5 pbw dimethylaminoethyl methacrylate and 74.9 pbw butyl methacrylate at 46 percent by weight solids in a solvent mixture containing 25.0 pbw ethyl acetate and 225.0 pbw butyl acetate. The acrylic copolymer was prepared using 1 pbw 2,2'-azobismethylethylacetonitrile (VAZO 67 from E. I. DuPont de Nemours and Company) and 0.5 pbw hypophosphorous acid. The product has a Gardner-Holdt viscosity of T-U, residual contents of methyl methacrylate, 2-ethylhexyl acrylate and isobornyl acrylate determined by gas chromatography of 0.10, 0.61 and 2.1 percent by weight respectively, a number average molecular weight in the range of about 30,746–39,763, a weight average molecular weight in the range of about 75,000–82,638, and a peak molecular weight in the range of about 124,452–137,005 as determined by gel permeation chromatography utilizing a polystyrene standard.
[3] A photoinitiator available as EM1173 from EM Chemicals.
[4] Available as FC-431 from 3M Corporation.

(c)(i) At least 10 samples (Set No. 1) of polycarbonate flat stock (Lexan ® 141) are coated with the clear, UV curable basecoat composition of part (a) and UV cured as follows. The basecoat composition is spray applied to the sample followed by a 5 minute flash at ambient temperature and a 3 minute flash at 150° F. (65.6° C.) and then cured by twice passing the sample at a rate of 40 ft/min beneath 4 medium pressure mercury vapor lamps each operating at 200 watts/inch at a distance of about 8 inches from the surface of the sample to provide a total exposure to the surface of the coating of about 2500–3500 millijoules/cm$^2$ per sample. The resultant cured films have a dry film thickness ranging from 0.5 to 1.5 mils.

(c)(ii) At least 10 samples (Set No. 2) of curved pieces of polycarbonate (Lexan ® 141) are coated with the clear, UV curable basecoat composition of part (a) and UV cured in the manner described in part (c)(i) for the "flat stock" to provide clear dry films of from 0.5–1.5 mils thickness.

(c)(iii) At least 10 additional samples (Set No. 3) of curved pieces of polycarbonate (Lexan ® 141) are flowcoated with the UV basecoat composition, flashed for 10–15 minutes at ambient temperature, and then UV cured by rotating the sample for 90 seconds at 4 revolutions/minute at a distance of 14 inches from 2 Fusion bulbs (H bulbs) each operating at 200 watts/inch. The resultant cured films have a dry film thickness of from 1.0–2.0 mils.

(d) Following application and curing of the basecoat composition on the substrates as described in parts (c)(i), (c)(ii) and (c)(iii) above, the cured films are vacuum metallized with aluminum using a CVM-61 Evaporation Unit from CVC Products, Inc., Rochester, N.Y. Operating conditions and materials utilized for the vacuum metallization were as follows: 99.999% pure aluminum wire of 0.062 inches in diameter (about 0.2 grams); chamber pressure of about $10^{-4}$ torr; current for aluminum evaporation of about 15 to 20 amperes; and distance between filament and substrate of from 5 inches (13 cm) to about 16 inches (40 cm) depending on the shape of the substrate.

(e)(i) Within 1 hour following the vacuum metallization, the vacuum metallized samples (Set No. 1) from part (c)(i) are coated with the clear, UV curable topcoat composition of part (b) and UV cured as follows. The topcoat composition is spray applied to the sample followed by a 5 minute flash at ambient temperature and a 3 minute flash at 150° F. (65.6° C.) and then cured by twice passing the sample at a rate of 40 ft/min beneath 4 medium pressure mercury vapor lamps each operating at 200 watts/inch at a distance of about 8 inches from the surface of the sample to provide a total exposure to the surface of the coating of about 2500–3500 millijoules/cm$^2$ per sample. The resultant cured films have a dry film thickness ranging from 0.5 to 1.5 mils.

(e)(ii) Within 1 hour following the vacuum metallization, the vacuum metallized samples (Set No. 2) from part (c)(ii) are coated with the clear, UV curable topcoat composition of part (b) and UV cured in the manner described in part (e)(i) to provide clear dry films of from 0.5–1.5 mils thickness.

(e)(iii) Within 1 hour following the vacuum metallization, the vacuum metallized samples (Set No. 3) from part (c)(iii) are flowcoated with the UV topcoat composition, flashed for 10–15 minutes at ambient temperature, and then UV cured by rotating the sample for 90 seconds at 4 revolutions/minute at a distance of 14 inches from 2 Fusion bulbs (H bulbs) each operating at 200 watts/inch. The resultant cured films have a dry film thickness of from 1.0–2.0 mils.

(f) A first set of each of the resulting cured, composite (basecoat/metallized layer/topcoat) films (Set Nos. 1–3) is scribed in a cross-hatch pattern and tested for adhesion according to test FLTM-BI 6-1. No. 610 tape from 3M Corporation is firmly pressed across the cross-hatched area and then quickly ripped from the film. The area beneath the cross-hatched pattern from which the tape is ripped is examined visually to determine the amount of area on the panel to which composite film is still adhered. A rating of "Pass" means that none of the composite film is removed from the substrate and the composite film exhibits no evidence of intercoat adhesion failure. The results are summarized in TABLE 3 below in the column labeled "Initial Adhesion".

A second set of each of the resulting cured, composite films (Set Nos. 1–3) is exposed to 120 hours of 98 plus or minus 2 percent relative humidity at 38 plus or minus 1° C. Next, the composite films are scribed in a cross-hatch pattern and tested for adhesion according to test FLTM-Bl 6-1 as described immediately above. A rating of "Pass" means that none of the composite film is removed from the substrate and the composite film exhibits no evidence of intercoat adhesion failure. The results are summarized in TABLE 3 below in the column labeled "120 Hrs Humidity".

A third set of each of the resulting, composite films (Set Nos. 1–3) is subjected to 5 complete cycles of the following: (1) 2 hours exposure to 98 plus or minus 2 percent relative humidity at 38 plus or minus 1° C., (2) 4 hours exposure to radiation from six, 274 watt, incandescent sunlamps at a distance of 12 inches from the composite film in a chamber maintained at 145 plus or minus 2° F., (3) 2 hours at minus 20 plus or minus 2° F., and (4) 16 hours exposure to radiation as described in (2) immediately above. Next the composite films are scribed in a cross-hatch pattern and tested for adhesion according to test FLTM-B1 6-1 as described immediately above. A rating of "Pass" means that none of the composite film is removed from the substrate and the composite film exhibits no evidence of intercoat adhesion failure. The results are summarized in TABLE 3 below in the column labeled "Cycle Test".

TABLE 3

| Set No. | Initial Adhesion | 120 Hrs Humidity | Cycle Test |
|---|---|---|---|
| 1. | Pass | Pass | Pass |
| 2. | Pass | Pass | Pass |
| 3. | Pass | Pass | Pass |

As can be seen from the results summarized in TABLE 3, the cured composite films exhibit excellent adhesion characteristics even after exposure to a variety of potentially destructive testing conditions.

EXAMPLE 2

This example illustrates the preparation of a basecoat composition and the application and curing of the basecoat on a substrate of polyester bulk molding compound (BMC) followed by vacuum metallization and application and curing of a topcoat composition of the invention.

(a) a clear, ultraviolet light (UV) curable basecoat composition is prepared by premixing the first two ingredients set forth in the following TABLE 4 and thereafter adding in order with stirring the remaining ingredients. The resulting UV curable composition contains 40 percent by weight solids and 60 percent by weight solvents.

TABLE 4

| BASECOAT COMPOSITION | |
|---|---|
| Component | Amount (pbw) |
| n-Butyl acetate | 299.4 |
| Chlorinated polyolefin[1] | 26.2 |
| Acrylic copolymer[2] | 320.3 |
| 2,2-Diethoxyacetophenone | 9.2 |
| Benzophenone | 9.8 |
| Alpha-hydroxy-alpha-dimethylphenyl ketone[3] | 6.6 |
| 1,6-Hexanediol diacrylate | 59.0 |

TABLE 4-continued

| BASECOAT COMPOSITION | |
|---|---|
| Component | Amount (pbw) |
| Ethoxylated trimethylol propane triacrylate[4] | 88.4 |

[1] A mixture of about 25 percent by weight chlorinated polyolefin in about 75 percent by weight xylene having a boiling point of 140° C. available as Eastman ® CP-343-3 from Eastman chemical Products, Inc.
[2] An acrylic copolymer prepared from 87.4 pbw isobornyl acrylate, 49.9 pbw methyl methacrylate, 25.0 pbw 2-ethylhexyl acrylate, 12.5 pbw dimethylaminoethyl methacrylate and 74.9 pbw butyl methacrylate at 46 percent by weight solids in a solvent mixture containing 25.0 pbw ethyl acetate and 225.0 pbw butyl acetate. The acrylic copolymer was prepared using 1 pbw 2,2'-azobismethylethylacetonitrile (VAZO 67 from E. I. DuPont de Nemours and Company) and 0.5 pbw hypophosphorous acid. The product has a Gardner-Holdt viscosity of T–U, residual contents of methyl methacrylate, 2-ethylhexyl acrylate and isobornyl acrylate determined by gas chromatography of 0.10, 0.61 and 2.1 percent by weight respectively, a number average molecular weight in the range of about 30,746–39,763, a weight average molecular weight in the range of about 75,000–82,638, and a peak molecular weight in the range of about 124,452–137,005 as determined by gel permeation chromatography utilizing a polystyrene standard.
[3] A photoinitiator available as EM1173 from EM Chemicals.
[4] Available as SR-454 from Sartomer Company and having a molecular weight of 428 and a specific gravity at 25° C. of 1.1101.

(b) A clear, UV curable topcoat composition is prepared as described in part (b) of Example 1 above.

(c)(i) At least 10 samples (Set No. 1) of curved pieces of polyester (BMC) plastic are coated with the clear, UV curable basecoat composition of part (a) and UV cured as follows. The basecoat composition is spray applied to the sample followed by a 5 minute flash at ambient temperature and a 3 minute flash at 150° F. (65.6° C.) and then cured by twice passing the sample at a rate of 40 ft/min beneath 4 medium pressure mercury vapor lamps each operating at 200 watts/inch at a distance of about 8 inches from the surface of the sample to provide a total exposure to the surface of the coating of about 2500–3500 millijoules/cm$^2$ per sample. The resultant cured films have a dry film thickness ranging from 0.5 to 1.5 mils.

(c)(ii) At least 10 additional samples (Set No. 2) of curved pieces of polyester (BMC) plastic are flow-coated with the UV basecoat composition of part (a), flashed for 10–15 minutes at ambient temperature, and then UV cured by rotating the sample for 90 seconds at 4 revolutions/minute at a distance of 14 inches from 2 Fusion bulbs (H bulbs) each operating at 200 watts/inch. The resultant cured films have a dry film thickness of from 1.0–2.0 mils.

(d) Following application and curing of the basecoat composition on the substrates as described in parts (c)(i) and (c)(ii) above, the cured films are vacuum metallized with aluminum using a CVM-61 Evaporation Unit from CVC Products, Inc., Rochester, N.Y. Operating conditions and materials utilized for the vacuum metallization were as follows: 99.999% pure aluminum wire of 0.062 inches in diameter (about 0.2 grams); chamber pressure 10$^{-4}$ torr; current for aluminum evaporation of about 15 to 20 amperes; and distance between filament and substrate of from 5 inches (13 cm) to about 16 inches (40 cm) depending on the shape of the substrate.

(e)(i) Within 1 hour following the vacuum metallization, the vacuum metallized samples (Set No. 1) from part (c)(i) are coated with the clear, UV curable topcoat composition of part (b) and UV cured as follows. The topcoat composition is spray applied to the sample followed by a 5 minute flash at ambient temperature and a 3 minute flash at 150° F. (65.6° C.) and then cured by twice passing the sample at a rate of 40 ft/min beneath 4 medium pressure mercury vapor lamps each operating at 200 watts/inch at a distance of about 8 inches from the surface of the sample to provide a total exposure to the surface of the coating of about 2500-3500 millijoules/cm² per sample. The resultant cured films have a dry film thickness ranging from 0.5 to 1.5 mils.

(e)(ii) Within 1 hour following the vacuum metallization, the vacuum metallized samples (Set No. 2) from part (c)(ii) are flowcoated with the UV topcoat composition, flashed for 10-15 minutes at ambient temperature, and then UV cured by rotating the sample for 90 seconds at 4 revolutions/minute at a distance of 14 inches from 2 Fusion bulbs (H bulbs) each operating at 200 watts/inch. The resultant cured films have a dry film thickness of from 1.0-2.0 mils.

(f) A first set of each of the resulting cured, composite (basecoat/metallized layer/topcoat) films (Set Nos. 1 and 2) is scribed in a cross-hatch pattern and tested for adhesion according to test FLTM-B1 6-1. No. 610 tape from 3M Corporation is firmly pressed across the cross-hatched area and then quickly ripped from the film. The area beneath the cross-hatched pattern from which the tape is ripped is examined visually to determine the amount of area on the panel to which composite film is still adhered. A rating of "Pass" means that none of the composite film is removed from the substrate and the composite film exhibits no evidence of intercoat adhesion failure. The results are summarized in TABLE 5 below in the column labeled "Initial Adhesion".

A second set of each of the resulting cured, composite films (Set Nos. 1 and 2) is exposed to 120 hours of 98 plus or minus 2 percent relative humidity at 38 plus or minus 1° C. Next, the composite films are scribed in a cross-hatch pattern and tested for adhesion according to test FLTM-B1 6-1 as described immediately above. A rating of "Pass" means that none of the composite film is removed from the substrate and the composite film exhibits no evidence of intercoat adhesion failure. The results are summarized in TABLE 5 below in the column labeled "120 Hrs Humidity".

A third set of each of the resulting, composite films (Set Nos. 1 and 2) is subjected to 5 complete cycles of the following: (1) 2 hours exposure to 98 plus or minus 2 percent relative humidity at 38 plus or minus 1° C., (2) 4 hours exposure to radiation from six, 274 watt, incandescent sunlamps at a distance of 12 inches from the composite film in a chamber maintained at 145 plus or minus 2° F., (3) 2 hours at minus 20 plus or minus 2° F., and (4) 16 hours exposure to radiation as described in (2) immediately above. Next the composite films are scribed in a cross-hatch pattern and tested for adhesion according to test FLTM-B1 6-1 as described immediately above. A rating of "Pass" means that none of the composite film is removed from the substrate and the composite film exhibits no evidence of intercoat adhesion failure. The results are summarized in TABLE 5 below in the column labeled "Cycle Test".

TABLE 5

| Set No. | Initial Adhesion | 120 Hrs Humidity | Cycle Test |
|---|---|---|---|
| 1. | Pass | Pass | Pass |
| 2. | Pass | Pass | Pass |

As can be seen from the results summarized in TABLE 5, the cured composite films exhibit excellent adhesion characteristics over the polyester (BMC) plastic even after exposure to a variety of potentially destructive testing conditions.

What is claimed is:

1. A metallized plastic substrate having directly adhered to the metallized surface thereof, a transparent, crosslinked film from a coating composition containing:

(A) from 4 to 10 percent of an oxalanilide ultraviolet light stabilizer dissolved in said coating composition, said stabilizer corresponding to the formula

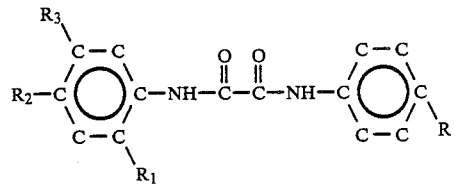

in which

R is $C_{6-22}$ alkyl or $C_{6-22}$ alkoxy, $R_1$ and $R_2$ are independently hydrogen, $C_{1-8}$ alkyl, $C_{1-12}$ alkoxy, $C_{1-12}$ alkylthio, phenoxy or phenylthio, provided that $R_1$ and $R_2$ may not both be selected from alkylthio, phenoxy and phenylthio, and $R_3$ is hydrogen or $C_{1-8}$ alkyl;

(B) from 20 to 80 percent of a radiation sensitive monomer having at least two addition polymerizable unsaturated bonds;

(C) from 0.1 to 5.0 percent of a photopolymerization initiator; and (D) from 80 to 20 percent of an acrylic addition polymer having at least one amino group and having a number average molecular weight of about 8,000-70,000, said addition polymer being derived from a mixture of copolymerizable ethylenically unsaturated monomers containing a monomeric ethylenically unsaturated amine;

wherein said percentages of (A), (B), (C) and (D) are by weight based on nonvolatile components of said coating composition.

2. The plastic substrate of claim 1 wherein said radiation sensitive monomer having at least two addition polymerizable unsaturated bonds comprises a (meth)acrylic ester of an organic polyol.

3. The plastic substrate of claim 2 wherein said (meth)acrylic ester comprises pentaerythritol triacrylate and hexanediol diacrylate.

4. The plastic substrate of claim 1 wherein R is isodecyl, $R_2$ and $R_3$ are hydrogen, and $R_1$ is methoxy or ethoxy.

5. The plastic substrate of claim 4 wherein $R_1$ is ethoxy.

6. The plastic substrate of claim 1 wherein the amount of monomeric ethylenically unsaturated amine in said mixture of copolymerizable ethylenically unsaturated monomers ranges from 1 to 25 percent by weight based on the total weight of monomers employed in the mixture.

7. The plastic substrate of claim 6 wherein said monomeric ethylenically unsaturated amine is selected from the group consisting of an acrylate-functional amine, a methacrylate-functional amine and a mixture thereof.

* * * * *